(12) United States Patent
Cooper

(10) Patent No.: US 7,611,321 B1
(45) Date of Patent: Nov. 3, 2009

(54) PORTABLE STORAGE SYSTEM

(76) Inventor: D. Jeffrey Cooper, 119 Comanche Trail, Lexington, NC (US) 27295

( * ) Notice: Subject to any disclaimer, the term of this patent is extended or adjusted under 35 U.S.C. 154(b) by 45 days.

(21) Appl. No.: 11/974,252

(22) Filed: Oct. 12, 2007

(51) Int. Cl.
  *B60P 1/04* (2006.01)
  *B62B 1/00* (2006.01)
  *B65F 3/26* (2006.01)

(52) U.S. Cl. .................. 414/475; 414/489; 414/491; 414/499; 198/312; 198/315; 198/803.1; 198/803.13

(58) Field of Classification Search ........... 414/475, 414/489, 491, 528, 499; 198/867.1, 803.1, 198/803.13, 312, 315
See application file for complete search history.

(56) References Cited

U.S. PATENT DOCUMENTS

| | | | | | |
|---|---|---|---|---|---|
| 2,360,209 | A | * | 10/1944 | Dalrymple | 198/803.13 |
| 4,243,353 | A | * | 1/1981 | Reed | 414/439 |
| 4,493,491 | A | * | 1/1985 | Karlik | 280/402 |
| 4,737,063 | A | * | 4/1988 | van den Pol | 414/346 |
| 4,889,464 | A | * | 12/1989 | Self | 414/491 |
| 5,002,340 | A | * | 3/1991 | Loggins | 298/1 V |
| 5,219,260 | A | * | 6/1993 | Smith et al. | 414/345 |
| 5,324,160 | A | * | 6/1994 | Smith | 414/475 |
| 5,967,733 | A | * | 10/1999 | Cash | 414/483 |
| 6,832,417 | B1 * | | 12/2004 | Choate | 24/600.1 |
| 2003/0159902 | A1 * | | 8/2003 | Hooijen et al. | 198/301 |

* cited by examiner

*Primary Examiner*—Saúl J Rodriguez
*Assistant Examiner*—Jonathan D Snelting

(57) ABSTRACT

A method of providing portable storage and a portable storage system including a vehicle for carrying a container. The vehicle includes a tilting bed carried by a wheeled carriage. A lift system tilts the bed from the carriage to load and unload the container by using a conveyor on the bed.

7 Claims, 16 Drawing Sheets

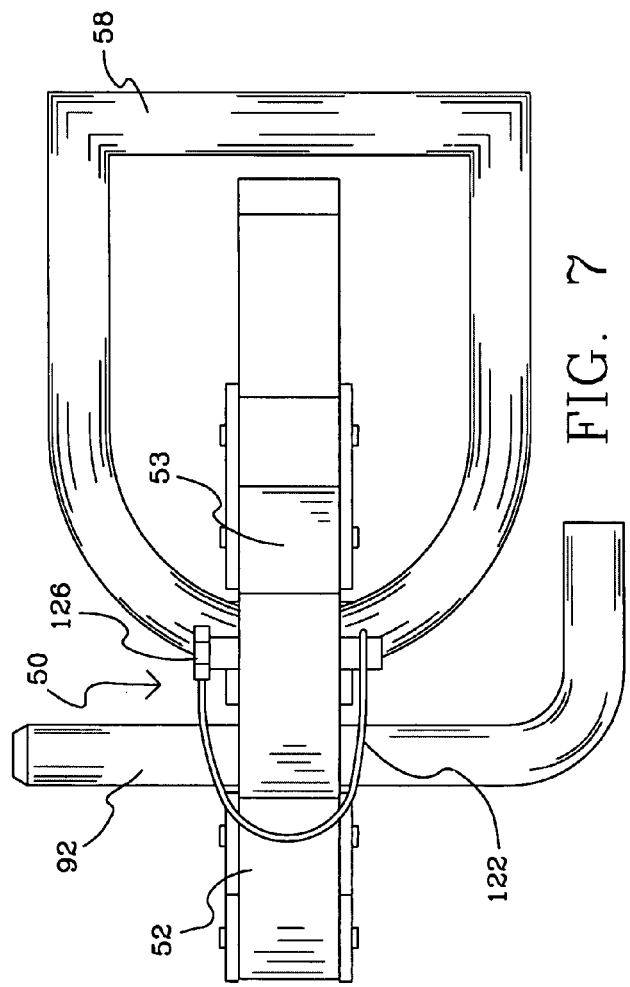
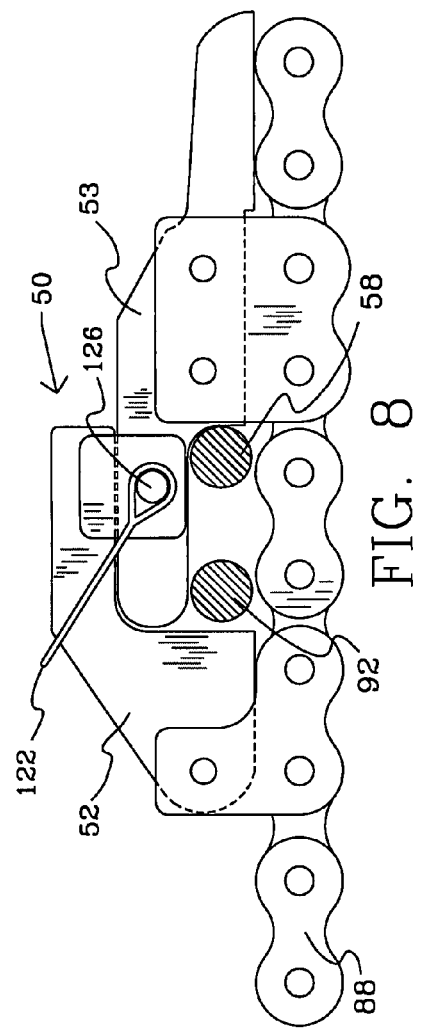

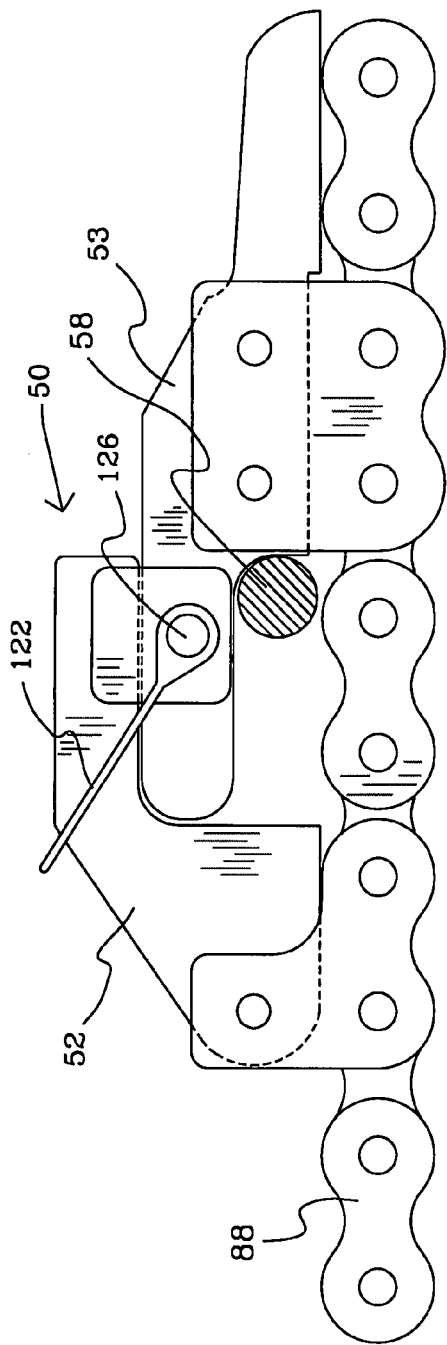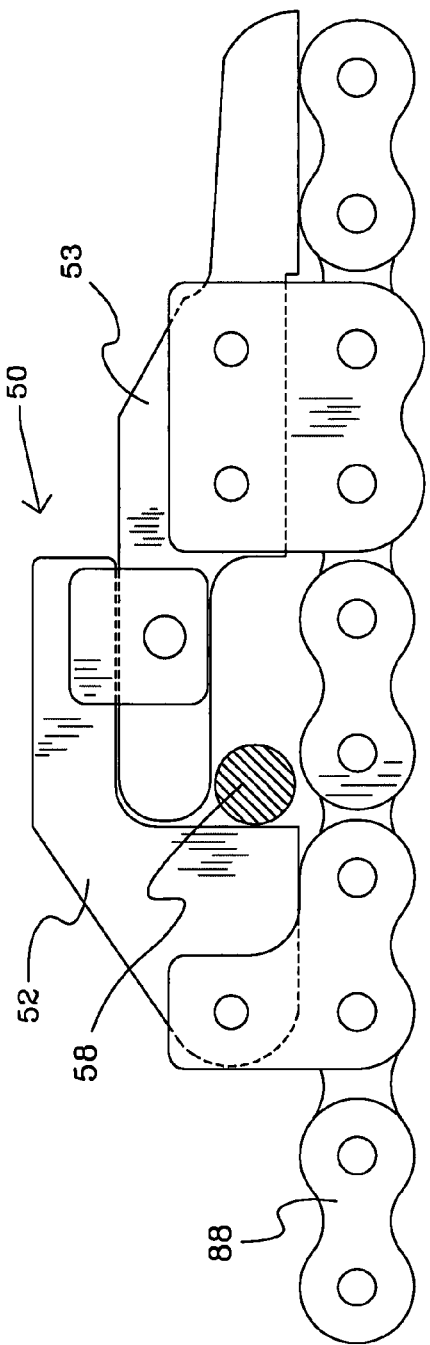
FIG. 9
FIG. 10

PORTABLE STORAGE SYSTEM

FIELD OF THE INVENTION

The invention disclosed herein relates to an improved portable storage system including a vehicle and a storage container.

DESCRIPTION OF THE PRIOR ART AND OBJECTIVES OF THE INVENTION

Portable storage systems are known. Many of these known systems involve delivering a container surrounded by a carriage on a flatbed truck to a destination where items can be placed in the container, such as provided by PODS Enterprises Inc. of Clearwater, Fla. Once the truck reaches such a destination, the carriage wheels can be lowered to suspend the container so that the truck can drive from under the container. Then the container is lowered to the ground and the carriage removed, leaving the container available to receive storage items. Such a flatbed truck and carriage system is expensive to manufacture, which leaves much room for improvement.

To reduce the expense and increase the availability of portable storage, the present invention was conceived and one of its objectives is to provide a portable storage system including a container and a vehicle having a tilting bed.

Another objective of the present invention is to provide a portable storage system including a vehicle having a tilting bed and a conveyor on the tilting bed for loading and unloading a container.

A further objective of the present invention is to provide a two-part latch fixed to a conveyor for joining a container to the conveyor.

Yet another objective of the present invention is to provide a vehicle having a bed and ratchetable straps for insertion into spaced apart openings on the container to secure the container on the bed.

Still another objective of the present invention is to provide a control system for a portable storage system which includes a vehicle having a tilting bed and a conveyor on the tilting bed for loading and unloading a storage container.

Yet still another objective of the present invention is to provide an improved method of delivering portable storage containers.

Various other objectives and advantages of the present invention will become apparent to those skilled in the art as a more detailed description is set forth below.

SUMMARY OF THE INVENTION

The aforesaid and other objectives are realized by providing a portable storage system including a vehicle for carrying a container. In the preferred embodiment of the invention, the vehicle includes a tilting bed carried by a wheeled carriage. A lift system tilts the bed from the carriage to load and unload the container using a conveyor atop the bed. A control system is provided for operating the vehicle including the lift system and a motor driving the conveyor with a latch fixed thereto for directing the container. The vehicle also includes ratchet straps securable in openings on the sides of the container for retaining the container on the bed.

A method is also disclosed of providing portable storage which includes loading the container on the vehicle, transporting the vehicle to a site for use, unloading the container from the vehicle and reloading the container on the bed for removal from the site.

BRIEF DESCRIPTION OF THE DRAWINGS

FIG. 7 is an enlarged plan view of the latch;

FIG. 8 is a side view of the latch with the pin and hold seen in cross-section;

FIG. 9 is another side view of the latch with the pin removed;

FIG. 10 is yet another side view of the latch with the hold advanced from that seen in FIG. 9;

DETAILED DESCRIPTION OF THE PREFERRED EMBODIMENTS AND OPERATION OF THE INVENTION

Figure 1:
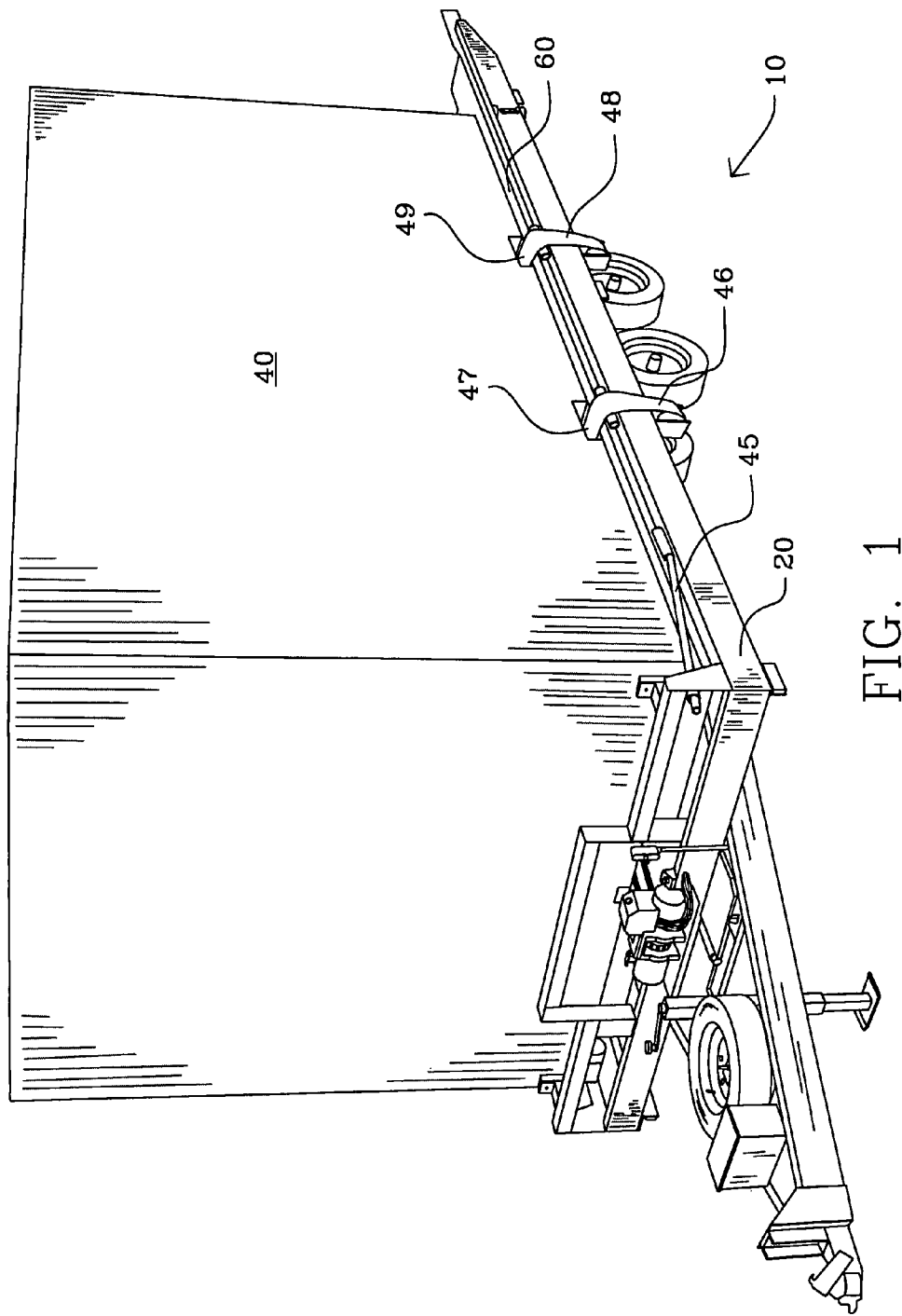
FIG. 1 is a front, side perspective view of the portable storage system.
Figure 2:
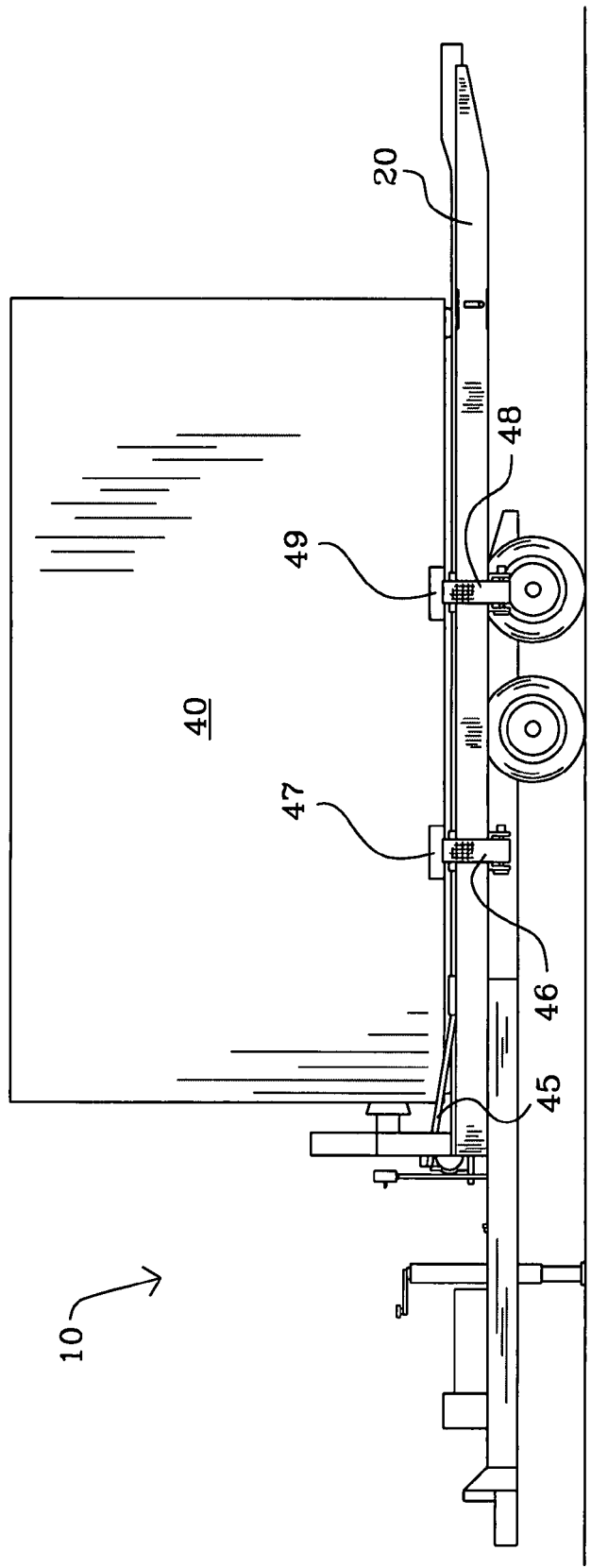
FIG. 2 is a side elevational view of the portable storage system.

For a better understanding of the invention and its operation, turning now to the drawings, FIGS. 1 and 2 show the preferred embodiment of portable storage system 10 including vehicle 20, which is shown as a trailer but could also be a flatbed truck, and container 40 for item storage. Container 40 is a box including a pair of rectangular openings 47, 49 in a side bottom that are sized and spaced to receive the tines of a forklift for handling. Nylon ratchet straps 46, 48 are wound upon bases rotatably fixed to vehicle 20 for extension into openings 47, 49 to secure container 40 on tilting bed 60. The opposite side of container 40 (not seen) includes a like pair of spaced openings and ratchet straps (not shown) opposing openings 47, 49 and ratchet straps 46, 48, respectively, shown in FIG. 1. Vehicle 20 carries a ratchet bar 45 for tightening ratchet straps 46, 48.

Figure 3:
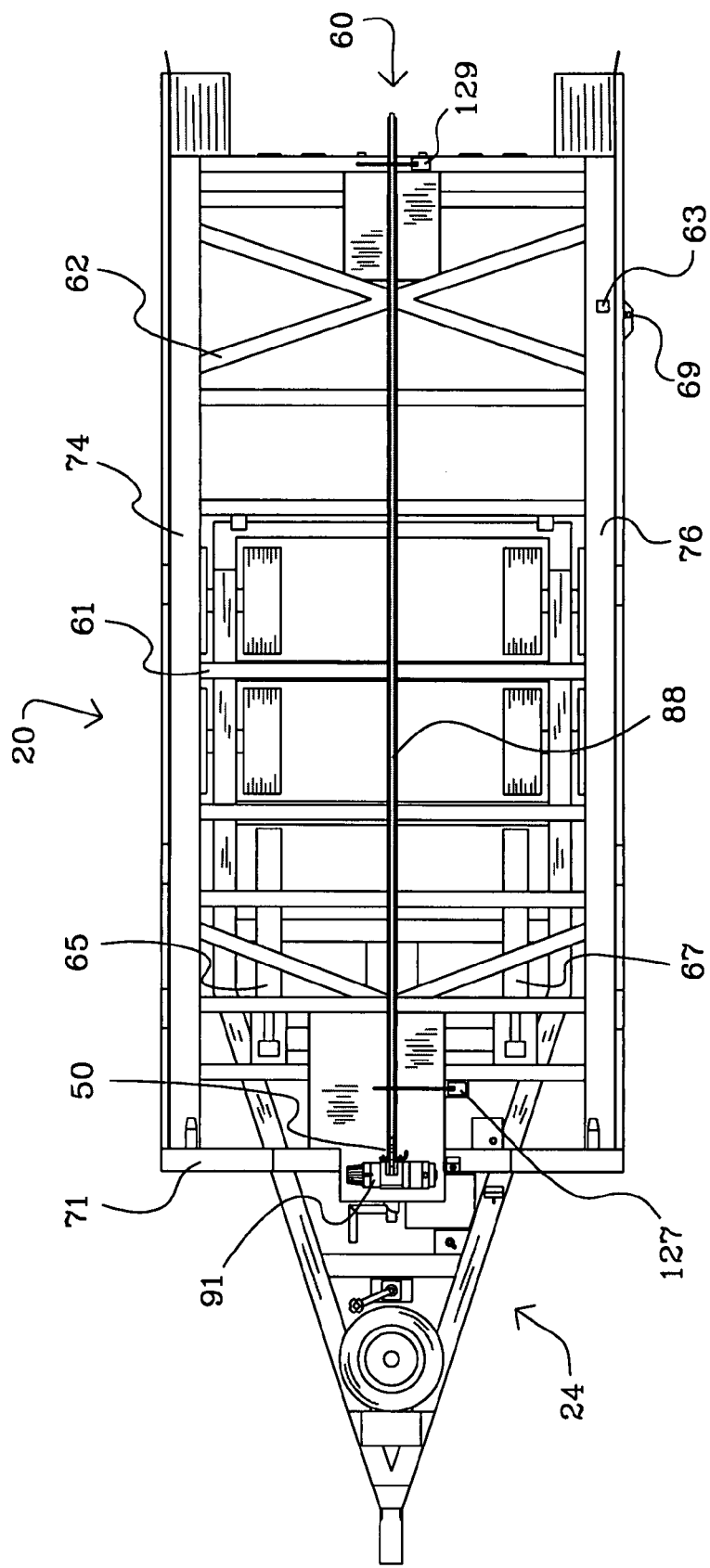
FIG. 3 is a top plan view of the vehicle of the portable storage system.
Figure 4:
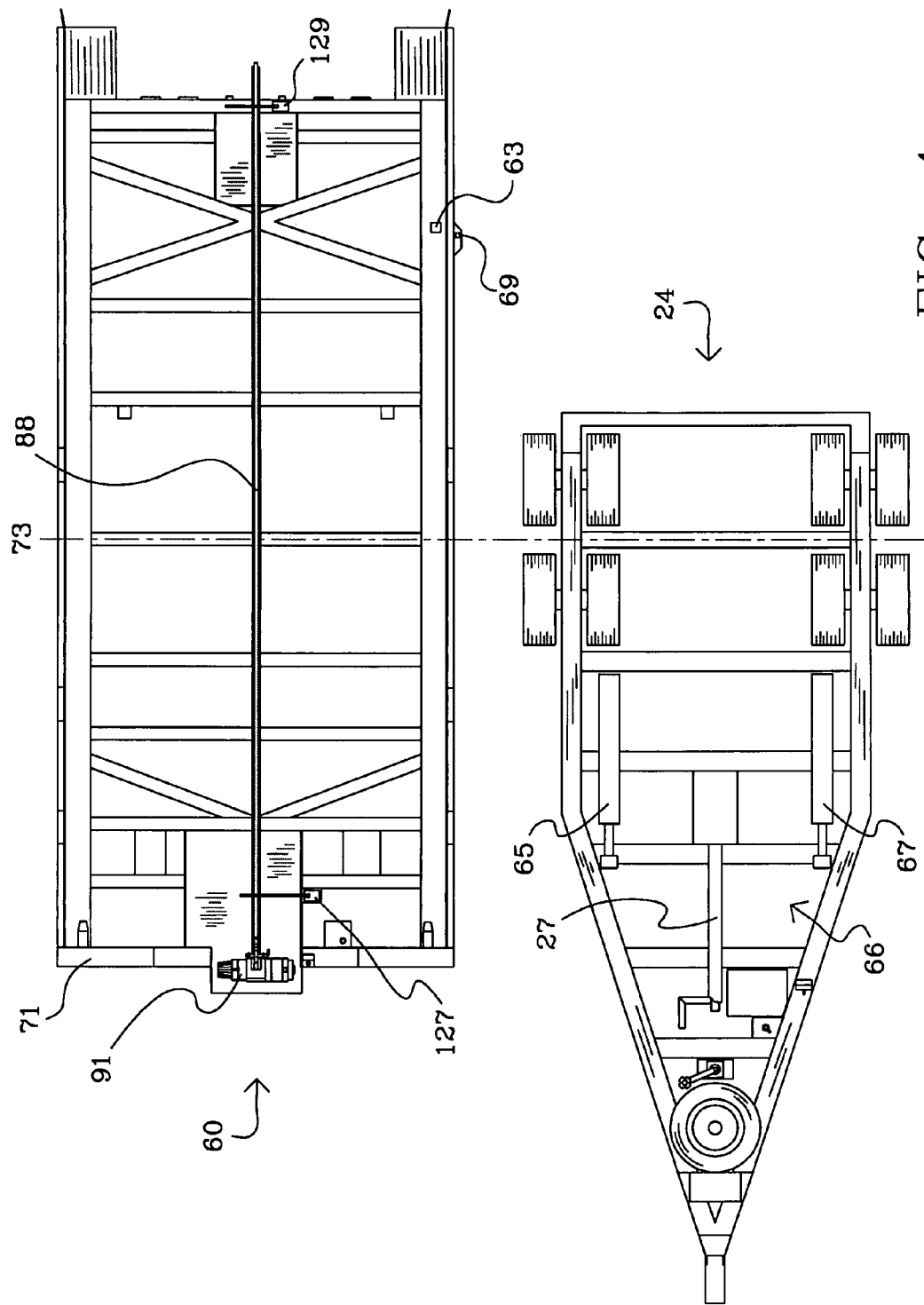
FIG. 4 is an exploded top plan view of the vehicle.

FIGS. 3 and 4 show the preferred embodiment of vehicle 20 including standard wheeled carriage 24 carrying hydraulic tilting bed 60. Restraining fence 71 is mounted at the forward end of bed 60. FIG. 4, in particular, shows pivot axis 73 about which tilting bed 60 rotates with respect to wheeled carriage 24. Bed lift system 66 includes a pair of hydraulic pistons 65, 67 which are each connected at one end to bed 60 and at a distal end to wheeled carriage 24 as shown schematically in FIG. 4. Lock 27 is mounted to wheeled carriage 24 to extend rearwardly to an opening (not shown) in the bottom of bed 60 for retaining bed 60 in relation to carriage 24.

Figure 15:
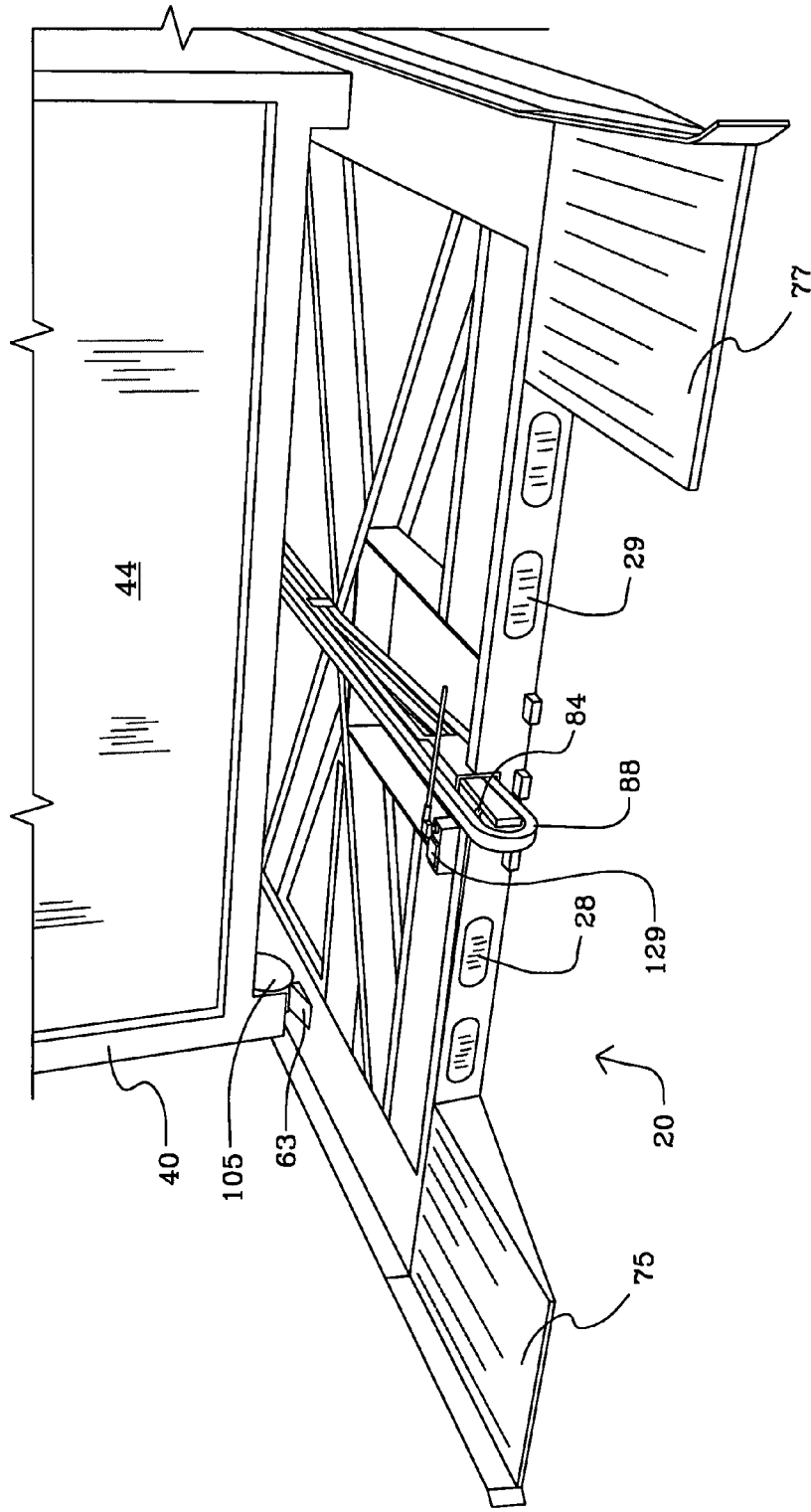
FIG. 15 is a partial rear perspective view of the portable storage system.

In the preferred embodiment of the invention, bed 60 includes a pair of beams forming opposing tracks 74, 76 extending from the front to the rear of bed 60. A plurality of transverse support members 61, 62 connect opposing tracks 74, 76 and support a conveyor support frame carrying a conveyor 88 on top of the members 61, 62. Conveyor 88 preferably is an endless chain carrying latch 50 on opposing sprockets, one of which is alternatively driven by motor 91 in opposite rotational directions, for loading and unloading container 40 from bed 60. Forward limit switch 127 proximate the front of conveyor 88 is positioned to be tripped by container 40 upon loading and rearward limit switch 129 proximate the rear of conveyor 88 positioned below container 40 is positioned to be tripped by latch 50 upon unloading. Chock 63 also seen in FIG. 15 is raised and lowered by lever 69 and as seen in FIGS. 3 and 4 are positioned at the rear of bed 60 in track 76. As understood, chock 63 and lever 69 could likewise be positioned on track 74. Chock 63 terminates the movement of container 40 therealong.

Figure 5:
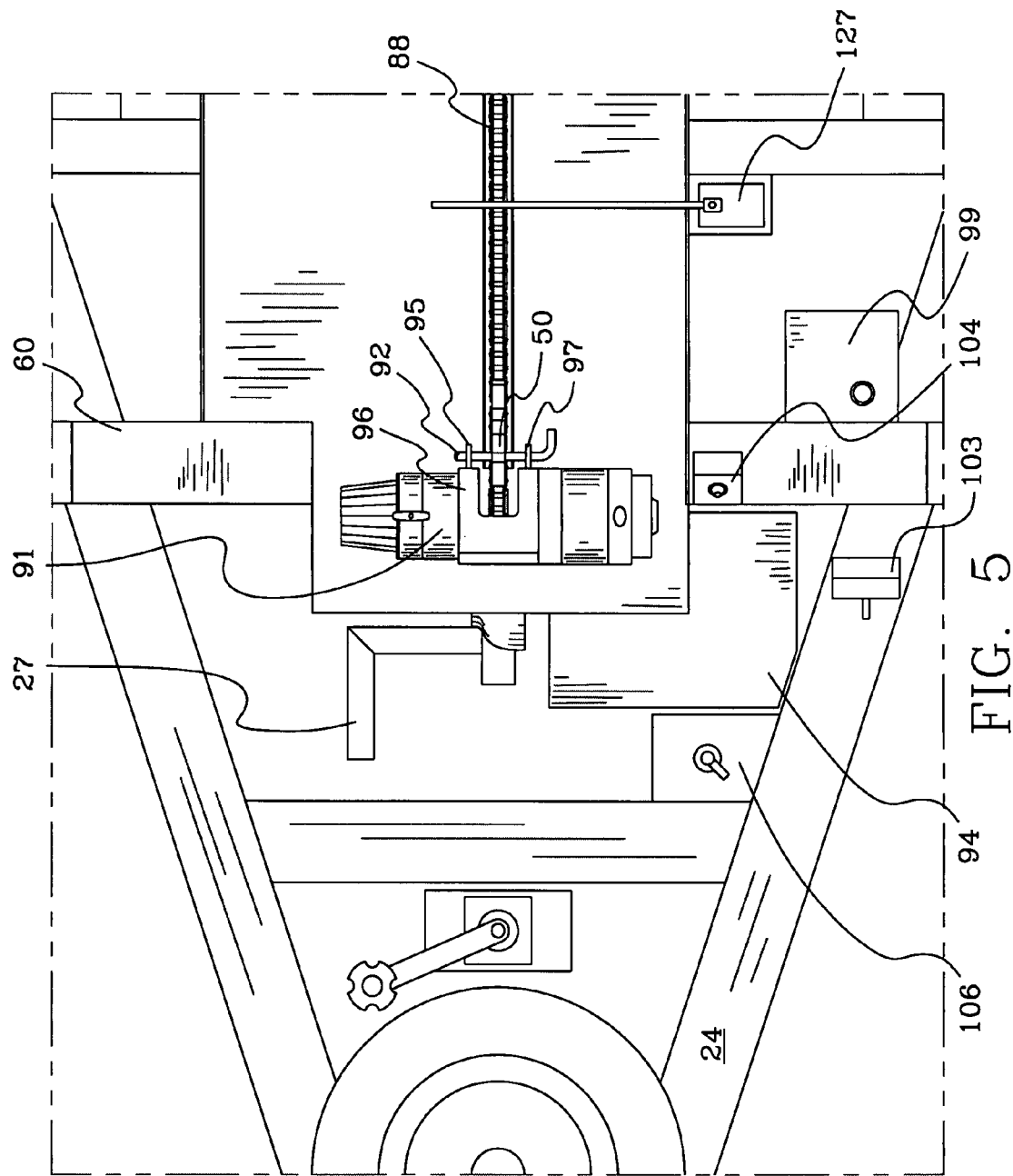
FIG. 5 is a partial enlarged top plan view of the front of the vehicle.

FIG. 5 shows power source 94 in the form of a standard storage battery mounted to wheeled carriage 24. Master power switch 106 isolates power source 94 and lock 27 retains bed 60 in fixed relation to carriage 24. Switch 103 is mounted to carriage 24 for up and down operation of bed lift system 66 (shown in FIG. 4) and nudge button switch 104 is provided to bump container 40 (shown in FIGS. 1 and 2) forward on bed 60 with forward limit switch 127 open. Motor 91 is mounted to bed 60 for driving conveyor 88 and lock 96 includes pin 92 for insertion through opposing arms 95, 97 fixed to bed 60 for retainment of latch 50 in fixed relation to bed 60. Pin 92 is manually removable from arms 95, 97 for insertion into key switch 99 to operate motor 91 to drive conveyor 88.

Figure 6:
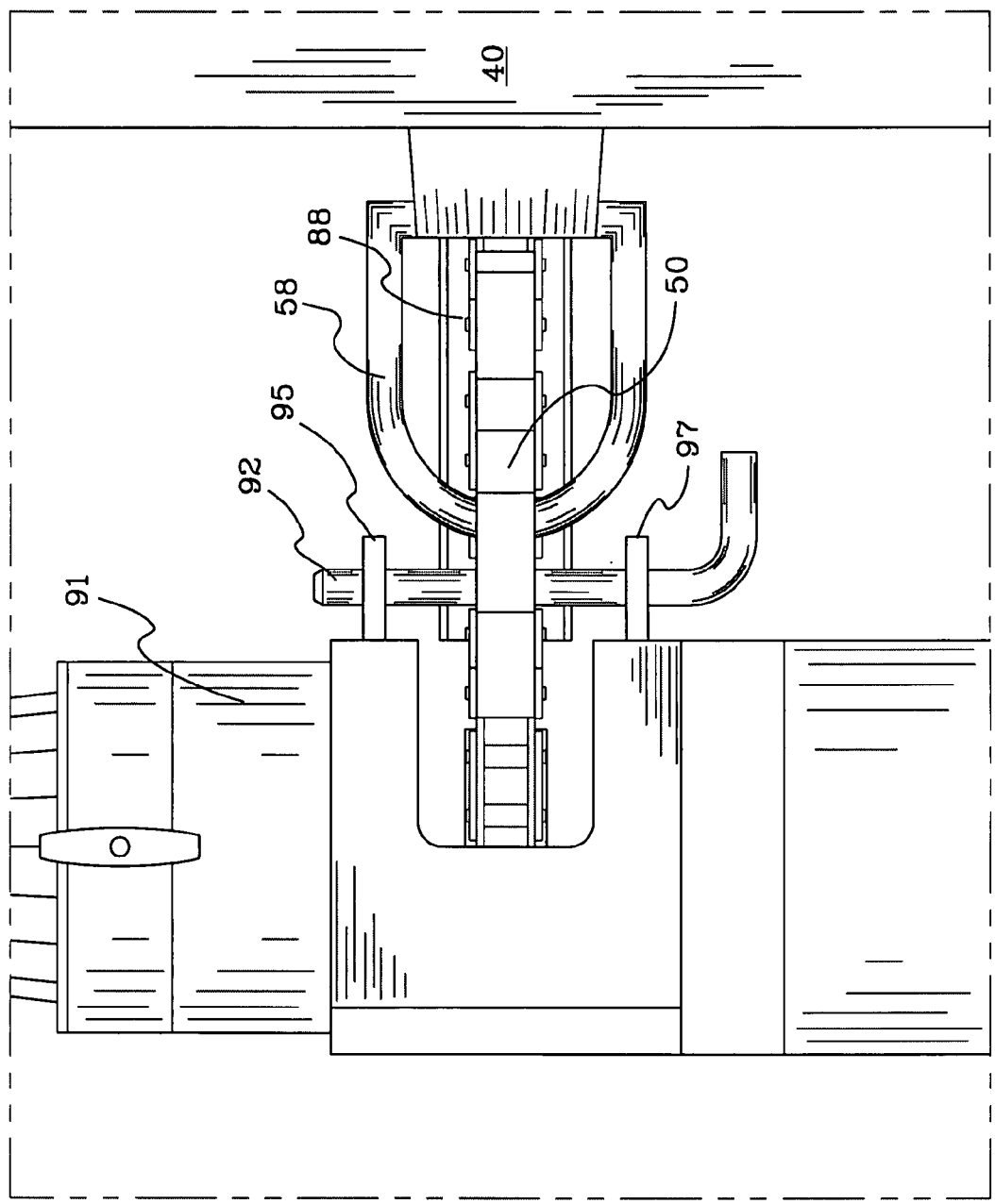
FIG. 6 is a partial enlarged top plan view of the lock for retaining a container on the vehicle.
Figure 11:
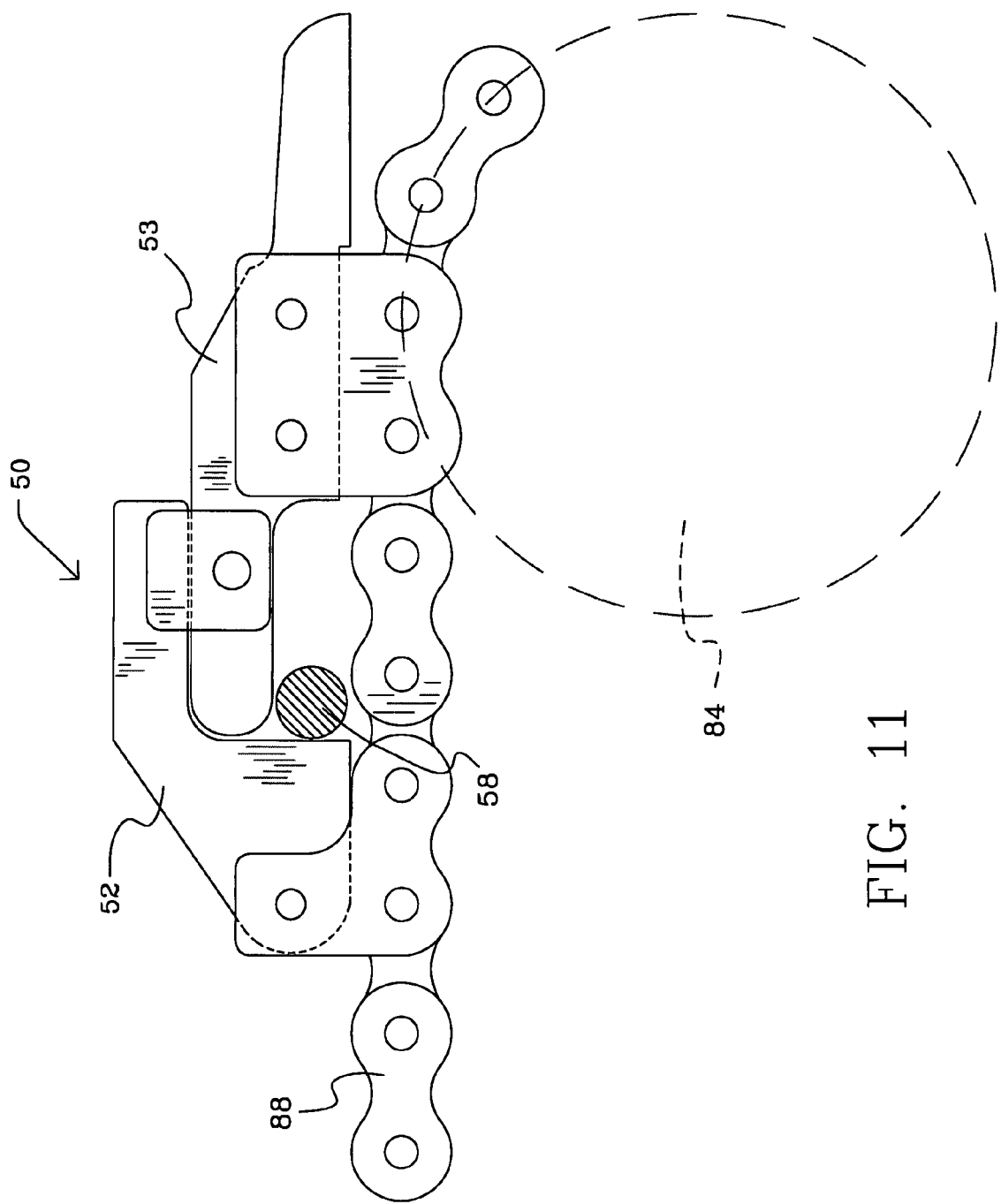
FIG. 11 a side view of the latch as it approaches a rear sprocket.
Figure 12:
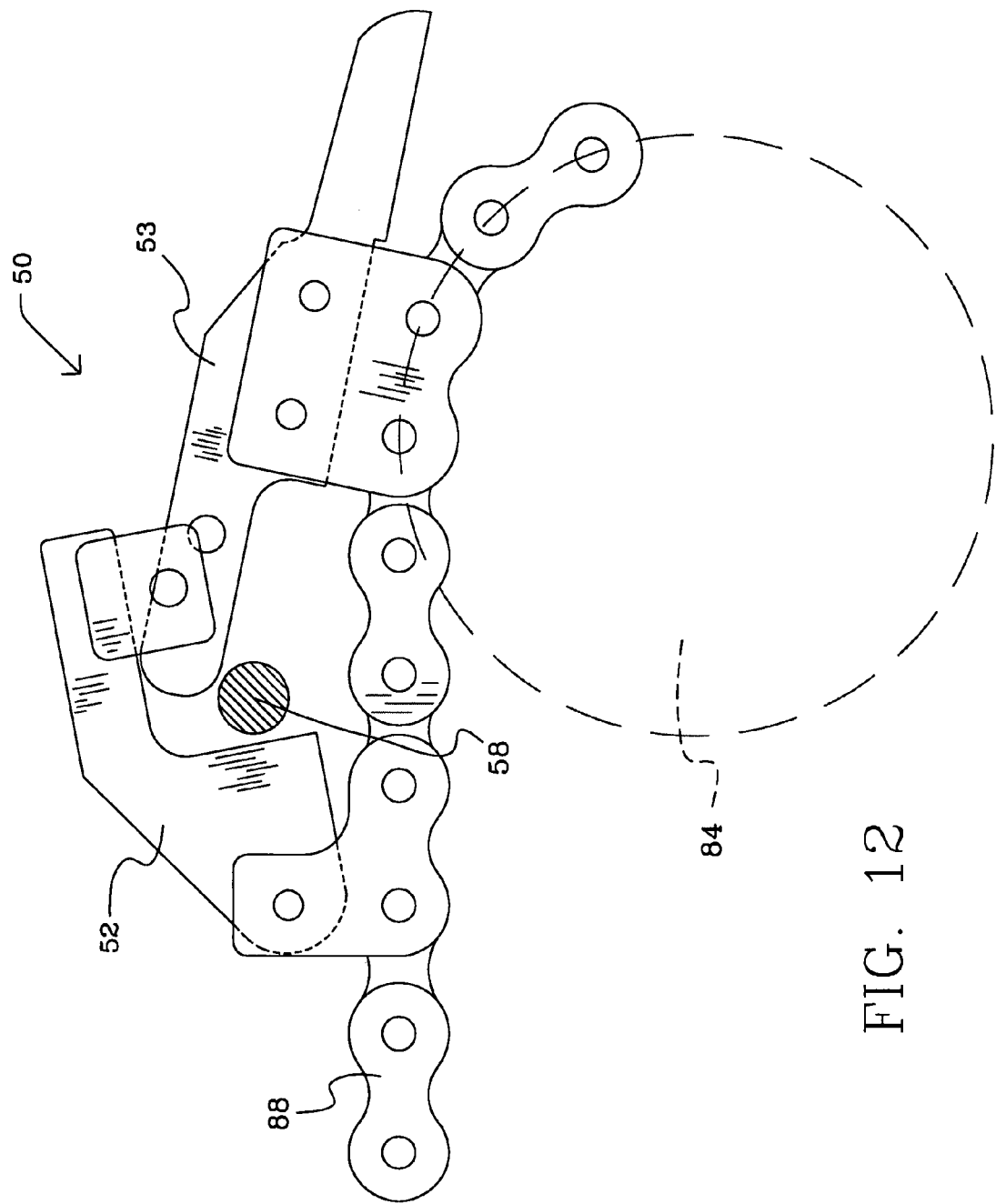
FIG. 12 is a side view of the latch rearwardly advanced from its position as seen in FIG. 11.
Figure 13:
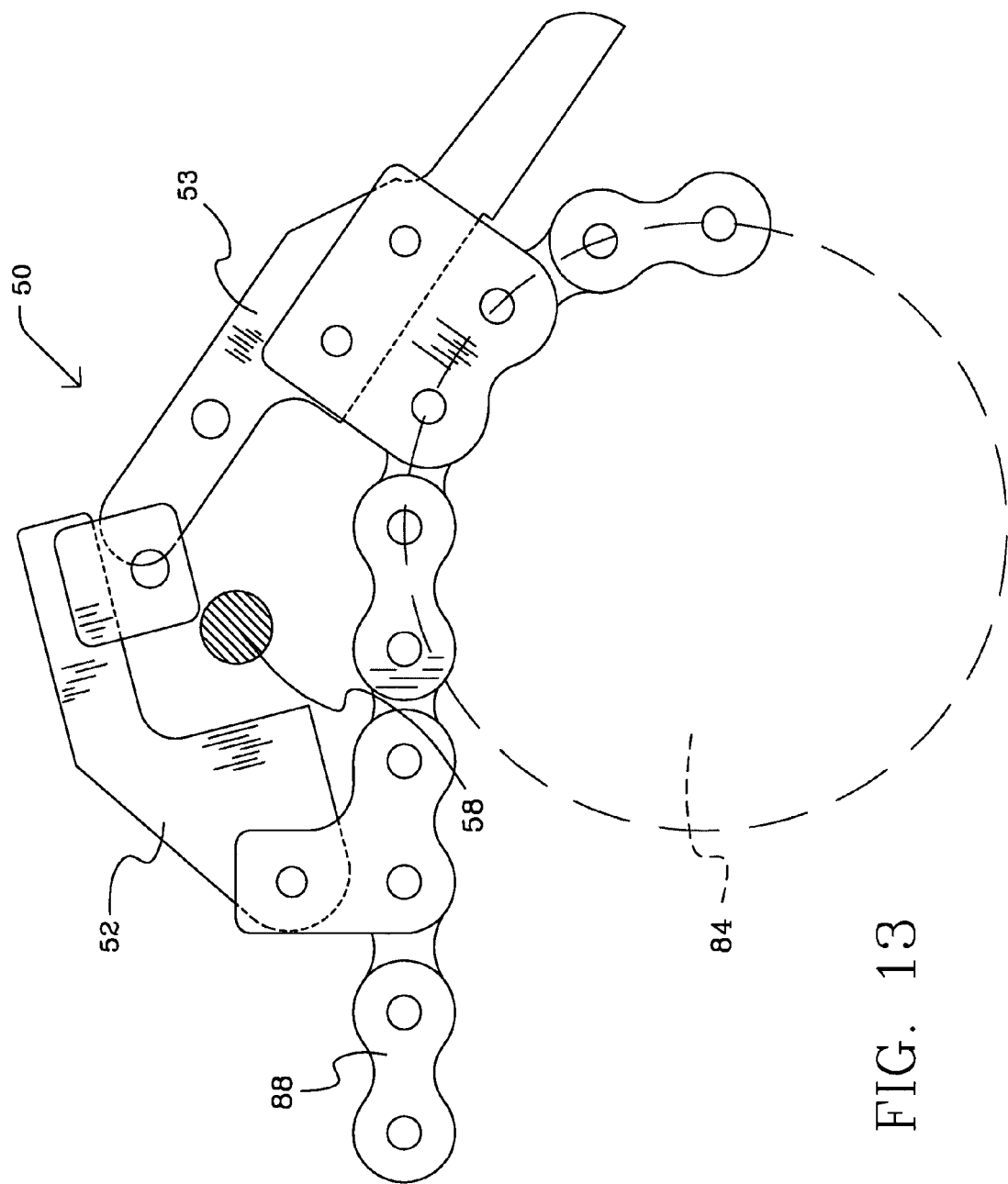
FIG. 13 is a side view of the latch more rearwardly advanced from its position as seen in FIG. 12.
Figure 14:
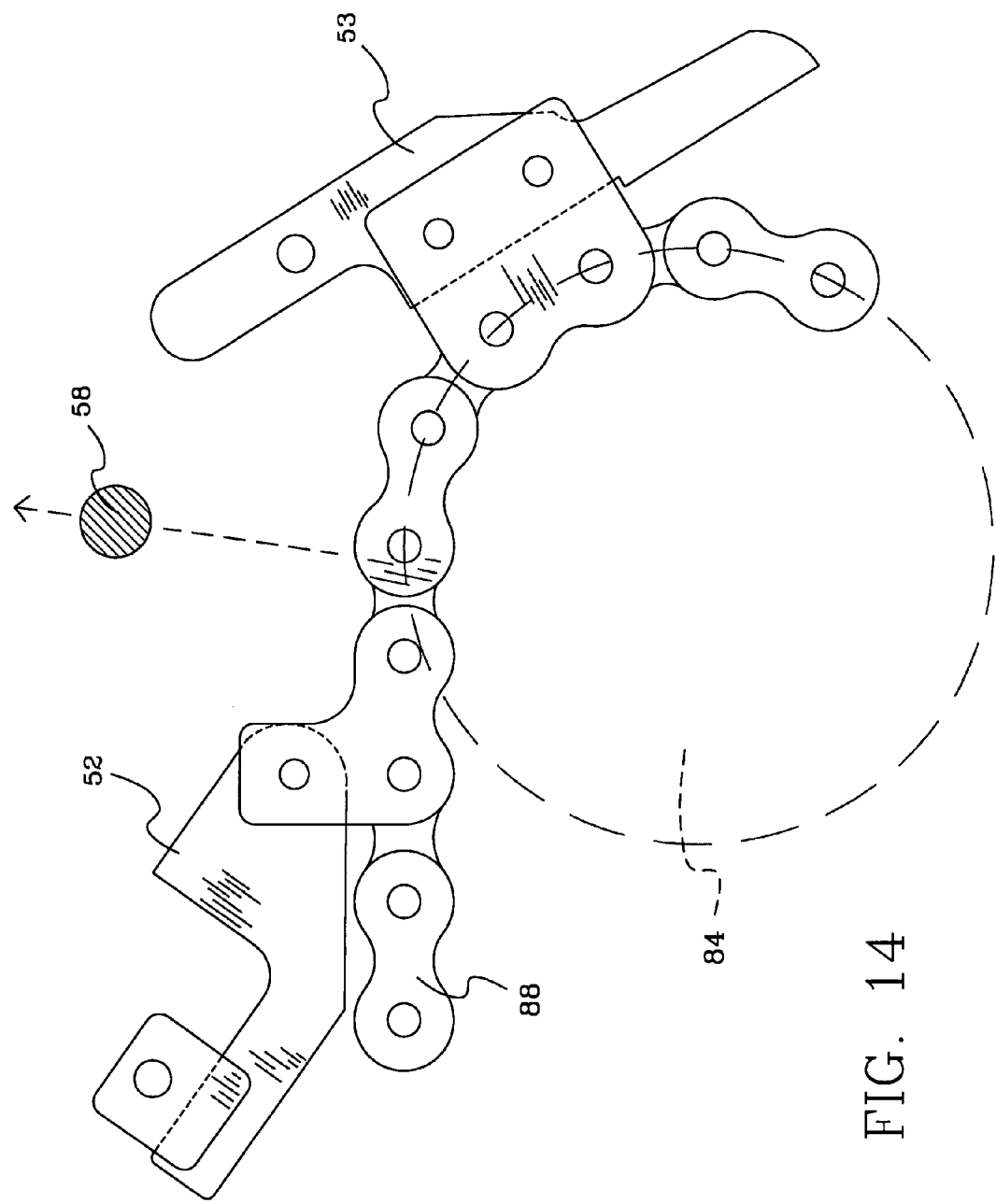
FIG. 14 is a side view of the latch in an open state with the hold in an escaped posture.

FIGS. 6-8 show preferred latch 50 including forward arm 52 rotatably coupled to conveyor 88 to extend rearwardly, above rearward arm 53, which is likewise rotatably coupled to conveyor 88. Removable lock pin 126 extends through arms 52, 53 to maintain latch 50 in a closed posture. Lock pin 126 includes U-shaped clasp 122 fixed at one end to lock pin 126 and having a loop at the other end sized to receive the opposite end of lock pin 126 (FIG. 9). Clasp 122 is utilized to retain pin 126 in position to provide an opening between conveyor 88 and arms 52, 53 for receiving both hold 58 and pin 92. Hold 58 is pivotably connected to container 40 and pin 92 extends through arms 95, 97 on lock 96 to retain latch 50 in relation to motor 91. Hold 58 is shown without container 40 in FIG. 7. Hold 58 and pin 92 are shown in schematic cross-section in FIG. 8.

FIGS. 9-10 show latch 50 with pin 92 removed for movement of latch 50 on conveyor 88 for loading or unloading container 40. When unloading container 40, as conveyor 88 moves, latch 50 also moves and hold 58 (shown in schematic cross-section in FIGS. 9-10) shown bearing against rearward arm 53 in FIG. 9 is then braced against forward arm 52 (FIG. 10) as conveyor 88 with latch 50 pull container 40 from bed 60 also shown in FIG. 18. When loading container 40 onto bed 60, as conveyor 88 and latch 50 move, hold 58 bears against rearward arm 53 as seen in FIG. 9. Lock pin 126 is removed from latch 50, thereby releasing forward arm 52 from rearward arm 53 and allowing latch 50 to slide from hold 58 for releasing container 40 from conveyor 88 described in more detail below.

FIGS. 11-14 show schematically movement of conveyor 88 and latch 50 with hold 58 of container 40 shown in schematic cross-section as conveyor 88 moves backwardly to rear sprocket 84 depicted schematically herein. As lock pin 126 is removed and as conveyor 88 and latch 50 turn on sprocket 84, rearward arm 53 begins to pivot pushing against forward arm 52 thereby opening latch 50 and releasing hold 58.

FIG. 15 shows the rearward end of container 40 and vehicle 20 which includes tail lights 28, 29 between opposing ramps 75, 77. A rear door 44 is provided for accessing the interior of container 40. Chock 63 is shown in a raised position behind a locking rear caster 105 on container 40. Also, rearward limit switch 129 is shown in position to avoid container 40 during unloading.

Figure 16:
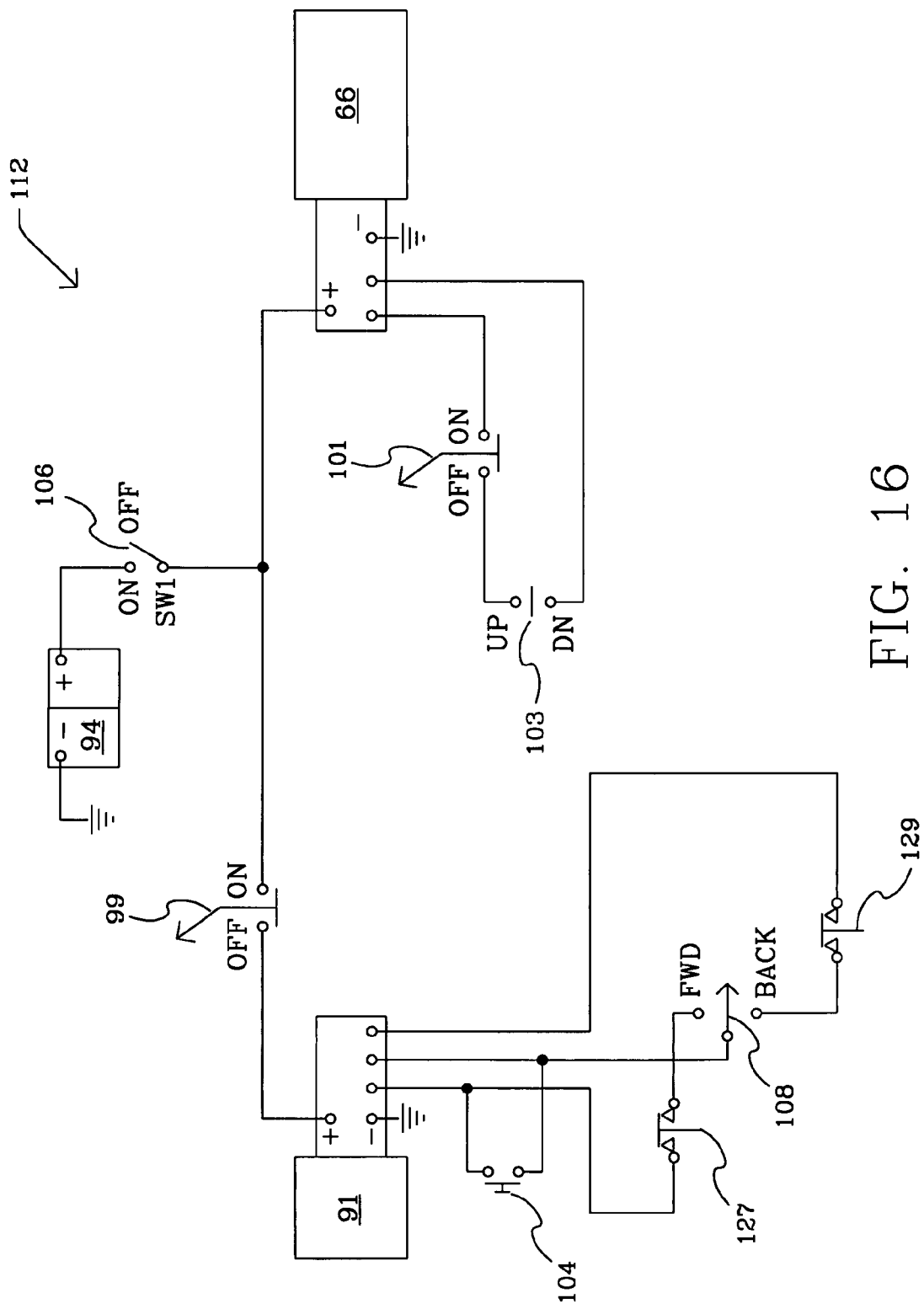
FIG. 16 is an electrical schematic of a control system for the vehicle.

FIG. 16 is a schematic diagram of the preferred embodiment of vehicle control system 112 depicting power source 94 (a standard 12V battery) electrically connected to one terminal of master power toggle switch 106. Lift system 66 and motor 91 are coupled to another terminal of switch 106. Closure of normally open safety switch 101, which is related to lock 27 (shown in FIGS. 4 and 5), permits operation of lift system 66 with switch 103.

Key switch 99 is wired to motor 91 to prevent operation of motor 91 unless switch 99 is closed. Forward 127 and rearward 129 limit switches are both wired to motor control device 108 and motor 91. Motor control device 108 includes a three-position switch that powers motor 91 to drive conveyor 88 (shown in FIGS. 3-5) in alternative rotational directions. When rearward limit switch 129 is open, which occurs when latch 50 (shown in FIGS. 5-14) moves rearwardly beyond switch 129, device 108 is inoperable to power motor 91 to drive conveyor 88 backwardly. When container 40 opens forward limit switch 127, device 108 is inoperable to power motor 91 to drive conveyor 88 to move latch 50 forward on conveyor 88. Nudge switch 104 is wired to motor 91 for bumping conveyor 88 incrementally forward when limit switch 127 is open.

Figure 17:
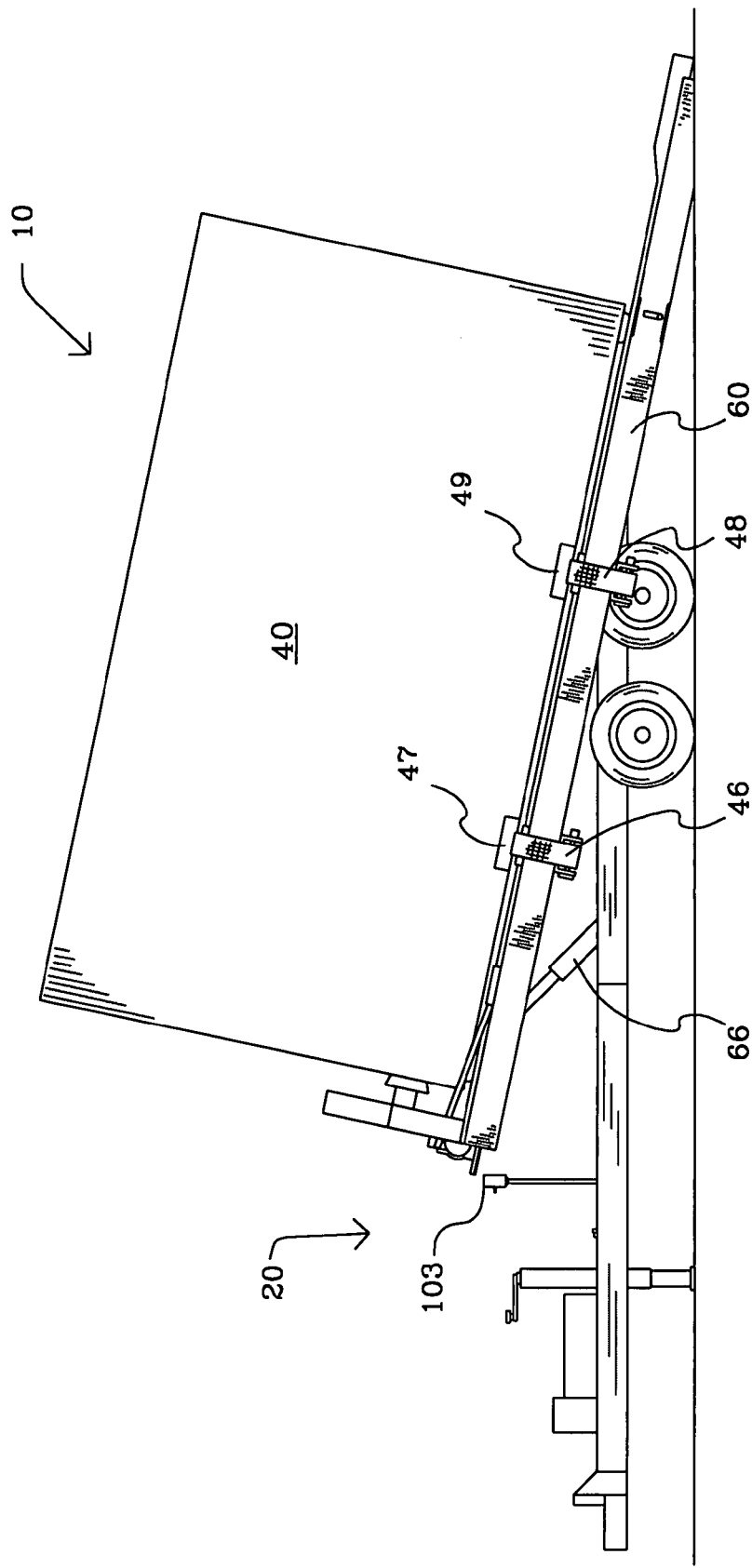
FIG. 17 is a side view of the portable storage system showing the front of the tilting bed raised.
Figure 18:
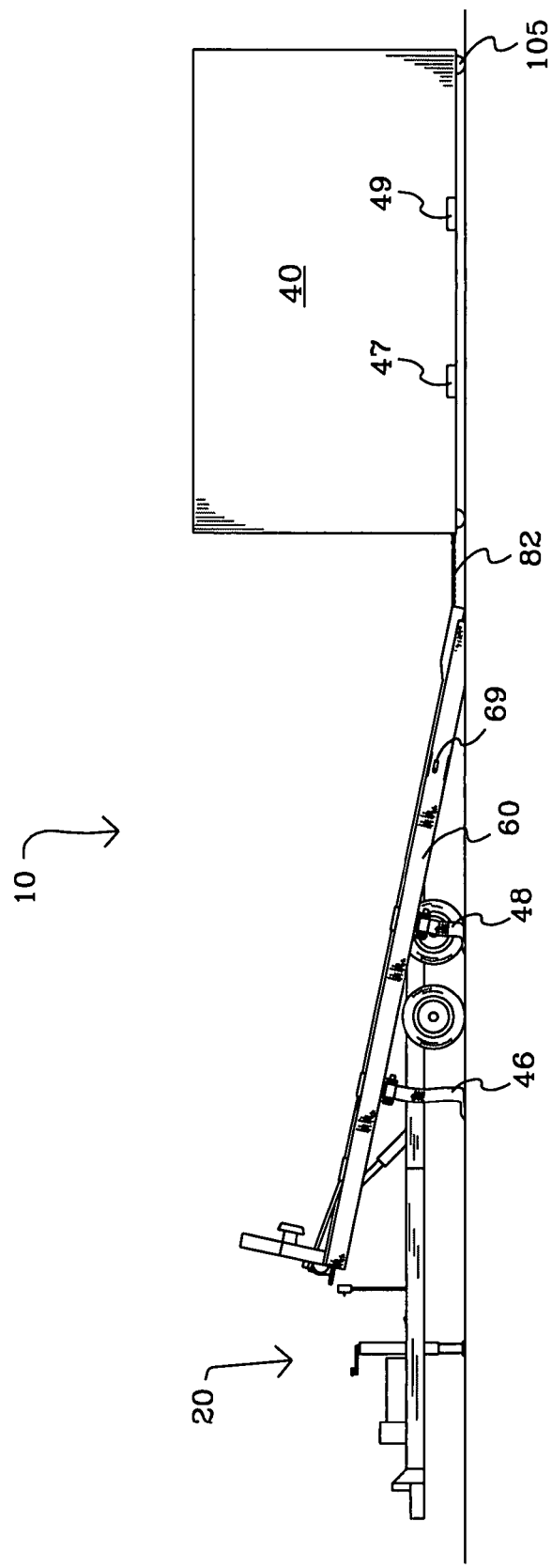
FIG. 18 is a side view of the system showing the storage container removed from the vehicle and on the ground.

With reference primarily to FIGS. 17-18, and generally to all of the Figs., the preferred method of using portable storage system 10 includes loading container 40 on tilting bed 60 and transporting bed 60 to a site. Master power toggle switch 106 is closed to provide access to power source 94 and lock 27 must be released to pivot bed 60 by closing switch 103 to energize lift system 66. Pin 92 is removed from arms 95, 97 and placed in key switch 99. Ratchet straps 46, 48 must be released to unload container 40. Clasp 122 is removed from pin 126, which can then be removed from latch 50 to release hold 58.

Device 108 operates motor 91 to drive conveyor 88 to move latch 50 and thus container 40 rearwardly on bed 60. Typically, motor control device 108 is connected to motor 91 by a cord that can be extended for use of device 108 in a remote fashion, such as at the side of vehicle 20. When latch 50 trips rearward limit switch 129, drive from motor 91 ceases and conveyor 88 coasts backwardly until hold 58 is free of latch 50. Container 40 remains at the site while storage items are loaded into or removed from its interior and vehicle 20 can be removed.

After work is completed at the site and container 40 is ready to be removed, vehicle 20 or the like is returned and bed 60 tilted to load container 40. Latch 50 is returned to the rear of conveyor 88 and drag chain 82 (FIG. 18) is secured in latch 50 at one end and hold 58 on container 40 at the other. Drag chain 82 is about 3 meters in length and is stored when not in use. Drag chain 92 is a standard link chain and has a hook on one end and a ring on the other. Motor 91 drives conveyor 88 to pull container 40 onto vehicle 20 until caster 105 on container 40 passes over chock 63, which is then manually raised by control lever 69 behind caster 105 to retain container 40 on bed 60 as seen in FIG. 15.

Once container 40 is retained on bed 60 by chock 63, drag chain 82 can be removed from hold 58 and latch 50. Next, conveyor 88 is rotated backwardly toward container 40 for affixing hold 58 to latch 50. Motor 91 is driven to pull container 40 onto bed 60 until container 40 trips forward limit switch 127, after which nudge button switch 104 is manually operated as needed to bump latch 50 to arms 95, 97. Pin 92 is then removed from key switch 99 and placed within arms 95, 97 through latch 50 as seen in FIGS. 6 and 8 to secure container 40 on bed 60. With container 40 so secured, standard lift system 66 can be operated to lower bed 60, which is retained in the lowered position by lock 27. Ratchet straps 46, 48 can then be fastened to container 40 and master power toggle switch 106 opened to isolate power source 94 for transporting container 40 to a storage location.

The illustrations and examples provided herein are for explanatory purposes and are not provided to limit the scope of the appended claims.

I claim:

1. A vehicle for transporting a storage container comprising:
- a tilting bed, said tilting bed for loading and unloading the container;
- an endless conveyor, a pair of sprockets, said conveyor mounted on said pair of sprockets, said pair of sprockets affixed to said tilting bed;
- a motor, said motor operably connected for driving said conveyor;
- a latch, said latch mounted on said conveyor, said latch for joining the container to said conveyor, said latch comprising a pivotable forward arm and a pivotable rearward arm, said forward arm engaging said rearward arm in a closed position and as said latch encounters one of said pair of sprockets said forward arm and said rearward arm each pivot to disengage and open said latch; and
- a key switch, a pin and a lock, said pin selectively positionable in said key switch for powering said motor, and alternatively positionable in said lock for retaining said latch, said lock proximate said motor, said lock comprising a pair of lock arms, said pin positionable through said pair of lock arms to retain said latch relative to said tilting bed.

2. The vehicle according to claim 1 further comprising a wheeled carriage supporting said tilting bed.

3. The vehicle according to claim 1 further comprising a chock for retaining the container on said bed.

4. The vehicle according to claim 1 further comprising a lock for retaining the container on said bed.

5. The vehicle according to claim 1 further comprising a ratchet strap for retaining the container on said bed.

6. The vehicle according to claim 1 further comprising a limit switch proximate one end of said conveyor and another limit switch proximate the opposite end of said conveyor.

7. The vehicle according to claim 1 further comprising a nudge switch for bumping the container forward on said bed.

* * * * *